(12) United States Patent
Bilogrevic et al.

(10) Patent No.: US 9,264,407 B2
(45) Date of Patent: Feb. 16, 2016

(54) COMPUTER-IMPLEMENTED SYSTEM AND METHOD FOR ESTABLISHING DISTRIBUTED SECRET SHARES IN A PRIVATE DATA AGGREGATION SCHEME

(71) Applicant: Palo Alto Research Center Incorporated, Palo Alto, CA (US)

(72) Inventors: Igor Bilogrevic, Vezia (CH); Julien Freudiger, Mountain View, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 92 days.

(21) Appl. No.: 14/244,797

(22) Filed: Apr. 3, 2014

(65) Prior Publication Data

US 2015/0288662 A1 Oct. 8, 2015

(51) Int. Cl.
*H04L 29/06* (2006.01)

(52) U.S. Cl.
CPC .......... *H04L 63/0428* (2013.01); *H04L 65/403* (2013.01)

(58) Field of Classification Search
CPC ...... H04L 2209/46; H04L 67/10; H04L 63/20
See application file for complete search history.

(56) References Cited

U.S. PATENT DOCUMENTS

| 7,167,565 | B2 | 1/2007 | Rajasekaran | |
|---|---|---|---|---|
| 2007/0116283 | A1* | 5/2007 | Tuyls | H04L 9/008 380/255 |
| 2010/0054480 | A1* | 3/2010 | Schneider | H04L 9/085 380/283 |
| 2012/0204026 | A1* | 8/2012 | Shi | H04L 9/3006 713/155 |
| 2013/0275752 | A1* | 10/2013 | Zhang | H04L 9/008 713/167 |

OTHER PUBLICATIONS

E. Shi et al., "Privacy-Preserving Aggregation of Time-Series Data," Net. and Distrib. Sys. Sec. Symp. (Feb. 2011).
T. Jung et al., "Data Aggregation Without Secure Channel: How to Evaluate a Multivariate Polynomial Securely," arXiv:1206:2660 (2012).
K. Xing et al., "Mutual Privacy Preserving Regression Modeling in Participatory Sensing," IEEE INFOCOM (Apr. 2013).
T.-H. H. Chan et al., "Privacy-preserving stream aggregation with fault tolerance," In Financial Cryptography and Data Security. 2012.
R. J. Hilderman et al., "Ranking the interestingness of summaries from data mining systems," In FLAIRS Conference, pp. 100-106, 1999.

* cited by examiner

*Primary Examiner* — Jason K Gee
(74) *Attorney, Agent, or Firm* — Patrick J. S. Inouye (57) ABSTRACT

A probabilistic system and method facilitates the sharing of a secret among participating users in a private way. The secret shares satisfy the condition that their sum equal a predefined number that is chosen by a third party aggregator. Without interacting with any other user, each user computes a secret share according to a predefined probability density function. If enough parties join, their secret shares can be combined by the aggregator with relative efficiency into a secret with a high likelihood of success.

22 Claims, 9 Drawing Sheets

COMPUTER-IMPLEMENTED SYSTEM AND METHOD FOR ESTABLISHING DISTRIBUTED SECRET SHARES IN A PRIVATE DATA AGGREGATION SCHEME

FIELD

This application relates in general to secure multiparty computation, and in particular, to a computer-implemented system and method for establishing distributed secret shares in a private data aggregation scheme.

BACKGROUND

Secure multiparty computation (SMC) is an area of cryptography concerned with providing multiple parties with the protocols for jointly computing a function over their inputs, while keeping the inputs private. Each party is presumed to possess private data that the party does not want to reveal to anyone else. One type of SMC protocol allows the parties to compute a combined or aggregate value using a public data sharing function for jointly sharing their respective private data while ensuring that their individual privacy is preserved.

Secret sharing is one form of SMC protocol. Secret sharing can be used, for example, for secure data storage or computing an aggregate value. Consider secure data storage. Here, a secret is split or shared across the computers of multiple users and each secret share is used in the public data sharing function. All, or a subset, of the secret shares are required to reconstruct the secret. Secret sharing is considered to be more secure than other forms of data security that rely on the storage of a secret on a single computer, as a compromise of any one computer will only leak a part of the secret.

Secret sharing has also been used in the context of online private data sharing. Here, a public function is considered secure if no party can learn any more from the description of the public function and the resultant aggregate value than what could be learned from knowledge of their own data. Parties may desire to permit the revelation of their personal information only under a veil of privacy that disassociates the private data from the contributing party. For instance, many online service providers harvest personal indicia, such as mobility, application usage patterns, browsing history, and social interactions, to build detailed user profiles that can be of potential value to advertisers and businesses. Despite being tracked and profiled, users invariably are not compensated for their private data contributions and online service providers often justify data harvesting as falling under their terms of service.

Until recently, by lacking an active role in the process, users have had little choice but to trust their service providers with their personal data, despite the risk to and loss of their privacy. However, secret sharing has provided one way for users to tolerate the seemingly-inevitable harvesting of their personal data by allowing users to instead offer a model or "gist" of their personal data in a privacy-preserving way. With secret sharing, each user encrypts his private data using a share of a secret. A central data aggregator combines the users' individually encrypted private data into an aggregate value that, upon being decrypted, provides a value representative of the private data without revealing either each user's identity or the actual value of their data contribution. For instance, some secret sharing schemes allow the central aggregator to obtain the sum of all private data contributions without knowledge of each specific input.

Conventionally, secret sharing assumes either trust or participant collaboration for secret establishment. For instance, U.S. Patent App. Pub. No. 2010/0054480, published Mar. 4, 2010, to Schneider, describes sharing a secret using polynomials over polynomials. In one embodiment, N shares of a secret are distributed by a distributor among cooperating entities by representing the secret as a secret polynomial over $GF(q)$, where q is a prime number or power of a prime number. A splitting polynomial of degree $(K-1)$ over $GF(q^m)$ is then constructed, where K is the number of shares necessary to reconstruct the secret and m is a positive integer. To reconstruct the secret, a reconstructor collects secret shares to form interpolating polynomials, and linearly combines the interpolating polynomials to recover the splitting polynomial. The original secret can then be extracted from the splitting polynomial. However, Schneider assumes the existence of a trusted entity willing to generate a splitting polynomial and that users are willing to cooperate with each other, which may be an unrealistic adversarial model.

U.S. Pat. No. 7,167,565, issued Jan. 23, 2007, to Rajasekaran, describes efficient techniques for sharing a secret. In one embodiment, a custodian computes n unique keys to be distributed to users and an exponentiated version of the secret. After key generation, the custodian deletes the secret itself and, following key distribution, also deletes its copies of the n unique keys. To reconstruct the secret, k of the n users must transmit their keys back to custodian. However, the custodian has no ability to reconstruct the secret without the collaboration and cooperation of at least k of the users and, as with Schneider, assuming such user cooperation may be an unrealistic adversarial model.

E. Shi et al., "Privacy-Preserving Aggregation of Time-Series Data," Net. and Distrib. Sys. Sec. Symp. (February 2011), describes a privacy mechanism, such that, for every time period, a data aggregator is able to learn some aggregate statistic, but not each participant's value, even when the aggregator has arbitrary auxiliary information. A group of participants periodically uploads encrypted values to the data aggregator, who is able to compute the sum of all participants' values in each time period, but is unable to learn anything else. However, Shi assumes a trusted data aggregator able to generate secret keys for each participant and itself and, after distributing a key to each user, the same data aggregator would destroy all participants' keys and retain only one extra key for itself.

Other secret sharing schemes, such as described in T. Jung et al., "Data Aggregation Without Secure Channel: How to Evaluate a Multivariate Polynomial Securely," arXiv:1206: 2660 (June 2012), and K. Xing et al., "Mutual Privacy Preserving Regression Modeling in Participatory Sensing," IEEE INFOCOM (April 2013) require participants to interact in a pairwise fashion to agree on secret shares, but such schemes scale quadratically with the number of participants and are impracticable in all but the smallest of populations.

Therefore, a need remains for an approach to forming secret shares that is both scalable and does not rely on blindly trusting a central data aggregator.

SUMMARY

The system and method described herein enables probabilistic establishment of secret shares among a plurality of entities, such that all obtained secret shares follow a given property. Here, all shares sum to a value determined by the central authority. Without interacting with any other user, each user computes a secret share according to a predefined probability density function. If enough parties join, their secret shares can be combined by the central authority with relative efficiency into a secret with a high likelihood of success.

One embodiment provides a computer-implemented system and method for establishing distributed secret shares in a private data aggregation scheme. A generator is chosen at random through an aggregator from a cyclic group of a set prime order defined over a range of values of private data. A distribution function over the cyclic group and a set of statistical parameters bounding the distribution function are also chosen through the aggregator. The set prime order, the statistical parameters and the generator are provided to a plurality of participants that each hold one of the values of the private data. A secret share is created for each participant by a probabilistic random sampling of the distribution function bounded by the statistical parameters. The private data value held by each participant is encrypted into encrypted data using the participant's secret share. The encrypted data of each participant is combined, through the aggregator, into an encrypted aggregate using the aggregator's secret share. A decrypted aggregate is found.

The foregoing approach neither requires trusted operations from a central authority nor interaction between users. Moreover, users can be easily added or removed from the data sharing scheme. Secret shares can also be easily updated. Finally, users agree on secret shares within a limited number of attempts, while the central authority can find a decryption share with a high probability of success and with a limited number of decryption trials.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
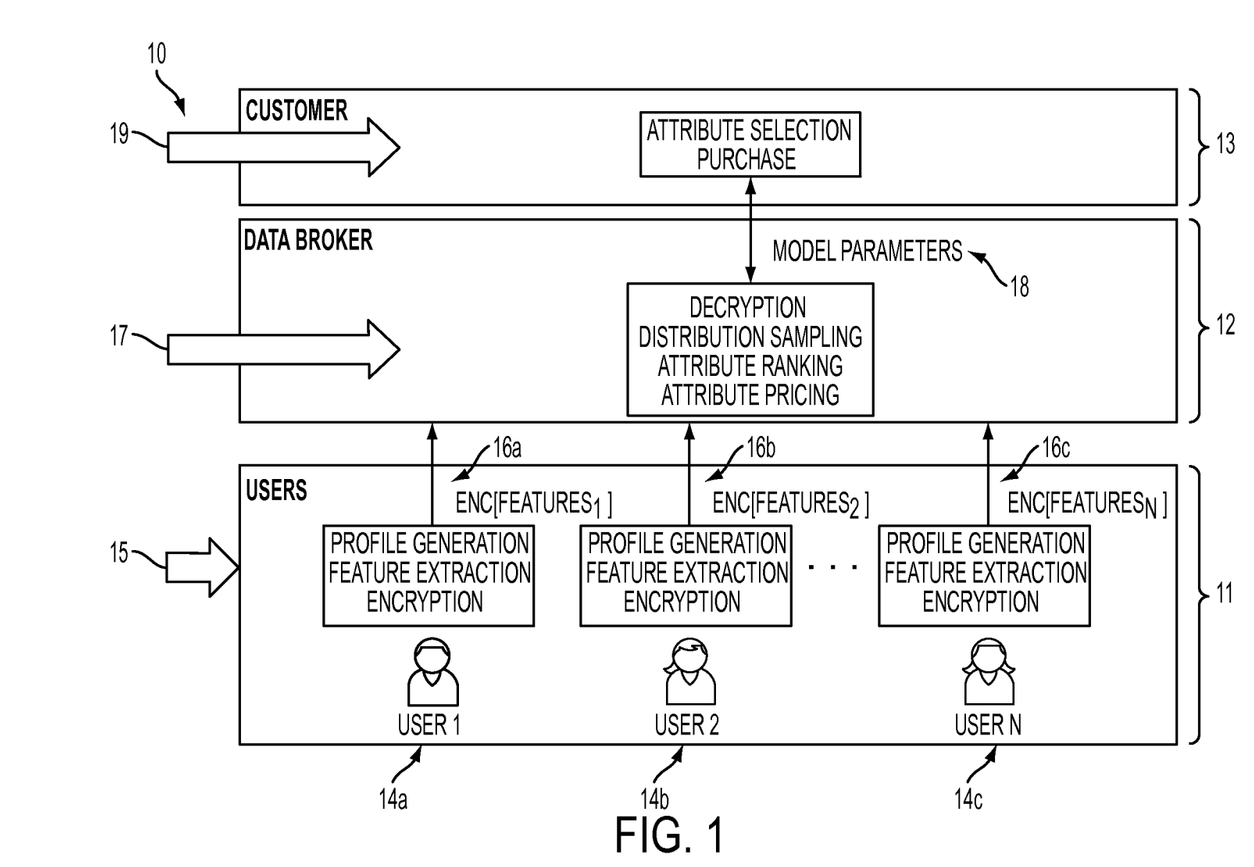
FIG. 1 is a data flow diagram showing a system architecture of one embodiment for privacy-preserving profile sharing.

The system and method described herein probabilistically establishes secret shares among distributed participating users, without requiring either trusted operations from a central authority or aggregator, or interactions between users. The secret shares enable users to share sensitive data with the aggregator in a privacy-preserving way. FIG. 1 is a data flow diagram showing a system architecture 10 of one embodiment for privacy-preserving profile sharing. Private data can be shared by users through this architecture 10 for various purposes, including compensated brokered data sharing. To initiate data sharing, each user 14a-c (in a set 11 of participating users) first generates a profile of the private data that they are willing to share in aggregated form, then extracts pertinent features from their profile, and encrypts the extracted features using a secret share (step 15). The encrypted features 16a-c are provided to the data broker (or central authority) 12, who decrypts the encrypted features 16a-c; samples a distribution of the decrypted features 16a-c; ranks attributes; and prices the attributes (step 17), such as described in commonly-assigned U.S. Patent application, entitled "Privacy-Sensitive Ranking Of User Data," Ser. No. 14/308,629, filed Jun. 18, 2014, pending, the disclosure of which is incorporated by reference. The data broker (or central authority) 12 and customer 13 exchange model parameters based on the sampling and ranking. Finally, the customer 13 performs selects attributes and purchases data from the data broker 12 (step 19). Other user, broker (or central authority), and customer operations are possible.

Figure 2:
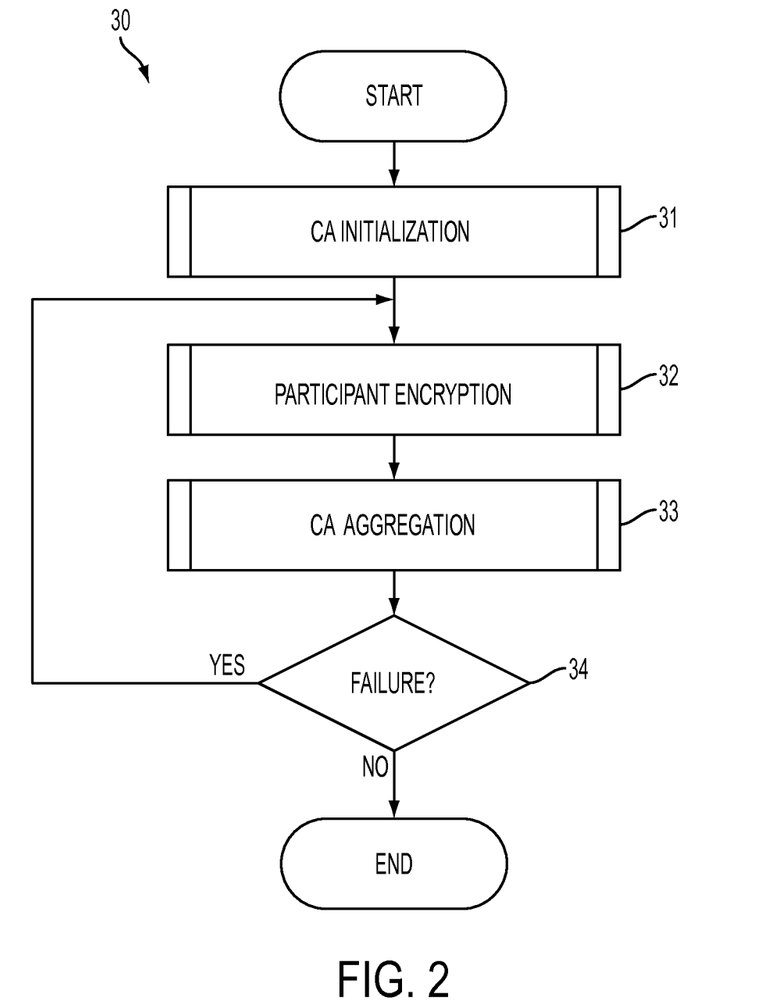
FIG. 2 is a flow diagram showing a computer-implemented method for establishing distributed secret shares in a private data aggregation scheme in accordance with one embodiment.

During data sharing, the users utilize secret shares to encrypt the features extracted from their profiles, and the data broker, acting as an aggregator or central authority, decrypts the encrypted features using a secret probabilistically-related to the secret shares to generate an aggregate value. The encryption, decryption, and aggregation of the shared private data will now be described in detail. FIG. 2 is a flow diagram showing a computer-implemented method 30 for establishing distributed secret shares in a private data aggregation scheme in accordance with one embodiment. The method is performed as a series of process or method steps performed by, for instance, a general purpose programmed computer, such as found in a client and server configuration, as further described infra with reference to FIG. 6.

The method proceeds in three stages that are performed between a central authority (CA), that is, a data broker or aggregator, and a group of n participants $U=\{u_1, u_2, \ldots, u_n\}$. First, the central authority performs initialization of the encryption parameters that are used aggregating data in a privacy-preserving way (step 31), as further described infra with reference to FIG. 3. Each participant, that is, user, then computes a secret share, without requiring either trusted operations from the central authority or interaction between the users, that is used to encrypt their private data (step 32), as further described infra with reference to FIG. 4. In turn, each participant provides their encrypted data to the central authority, who attempts to decrypt and aggregate the encrypted data into an aggregate value (step 33), as further described infra with reference to FIG. 5. The central authority attempts to decrypt the encrypted private shares by discovering the secret based on the predefined probabilistic density function. However, decryption within a small number of attempts is not guaranteed and if the central authority fails to decrypt the encrypted data within a predetermined number of attempts (step 34), the participants will be instructed to repeat secret share computation and private data encryption (step 32), after which the central authority will again attempt to decrypt and aggregate the encrypted data (step 33) until a maximum number of decryption attempts is reached. The method finishes with the central authority either succeeding at decryption and obtaining an aggregate value, or failing decryption after a maximum number of attempts.

The central authority does not perform trusted operations as a precondition to encryption by the participants. Rather, to facilitate the data sharing, the central aggregator chooses a probabilistic function that is provided to the participants. The probabilistic function is selected to ensure that the participants' secret shares satisfy the condition that their sum equals a predefined number and thereby enables the central authority to decrypt their individual encrypted private data without knowledge of each specific input. In particular, the property of interest is described as follows:

$$sk_0 + \sum_{i=1}^{n} sk_0 = 0$$

The high level idea with this property of interest is that each of the 1 to n participants selects a secret share at random, according to a given probability density function. By the Central Limit Theorem, the arithmetic mean of all secret shares is known to be approximately normally distributed. By the Law of Large Numbers, the sample average is known to converge in probability and almost certainly to the expected value $\mu$ of the probability density function as n goes to infinity. In other words, the data aggregator will be able to find an $sk_0$ close to $\mu$ that satisfies the above property with high likelihood.

Figure 3:
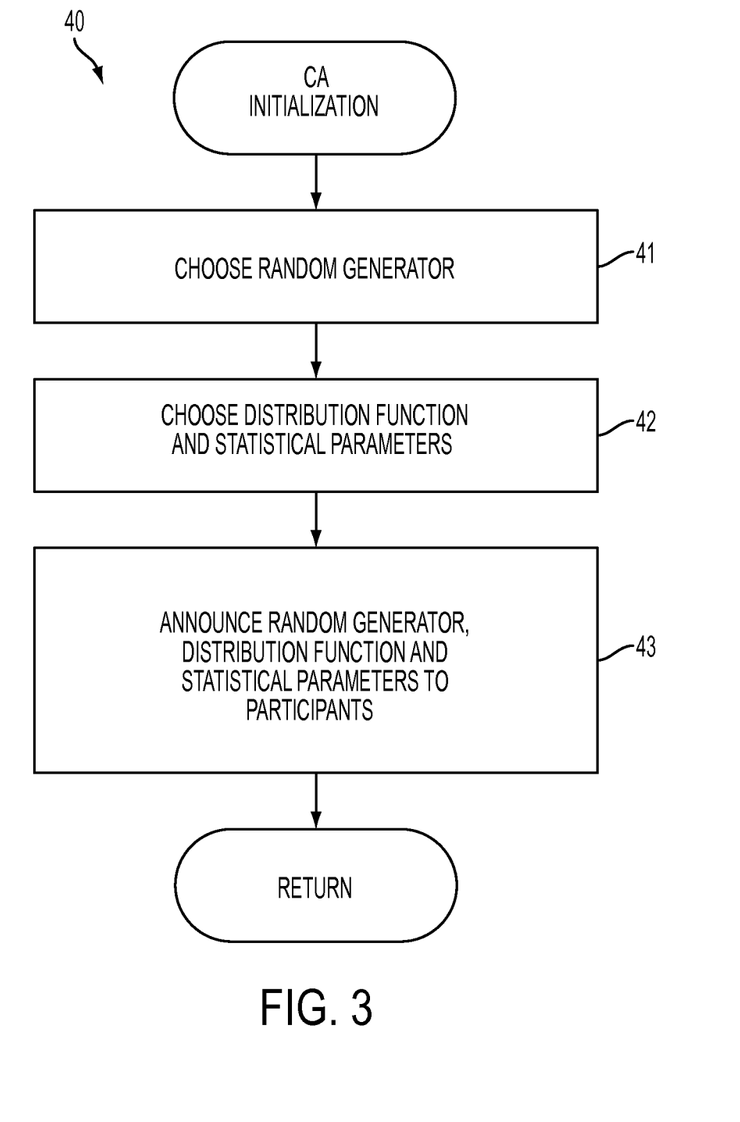
FIG. 3 is a flow diagram showing a routine for performing central authority initialization for use in the method of FIG. 2.

FIG. 3 is a flow diagram showing a routine 40 for performing central authority initialization for use in the method 30 of FIG. 2. Each participant $u_i \epsilon U$ has a unique value $x_i$, which represents private data, such that $x_i \epsilon \mathbb{Z}_p$, where p is a prime order. The participant wishes to have his private data $x_i$ aggregated by the central authority with the private data of other participants in a privacy-preserving way. The central authority first chooses a generator g at random, such that $g \epsilon \mathbb{G}$, where $\mathbb{G}$ is the cyclic group of the prime order p (step 41). The central authority also chooses a probability density function $f(\ )$ defined over $\mathbb{Z}_p$ and statistical parameters, which bound $f(\ )$ (step 42). In general, the central authority will choose the mean $\mu$ and the standard deviation $\sigma$ of the distribution function as the statistical parameters, although other statistical parameters could also be used mutatis mutandis. Typically, the distribution function $f(\ )$ is a Gaussian distribution, the mean $\mu$ is typically represented with 1024 or more bits, and the standard deviation $\sigma$ could be of 128 or fewer bits, although other types of distributions and bit-sizes of mean and standard deviation are possible.

Finally, to initialize the state necessary to perform the methodology at each participant, the central authority announces (g, $f(\ )$, $\mu$, $\sigma$), that is, the random generator g, distribution function $f(\ )$, and statistical parameters $\mu$ and $\sigma$, to the participants (step 43). No other information is provided to the participants, and the central authority does not announce (g, $f(\ )$, $\mu$, $\sigma$) to any other users not participating in the data sharing.

Figure 4:
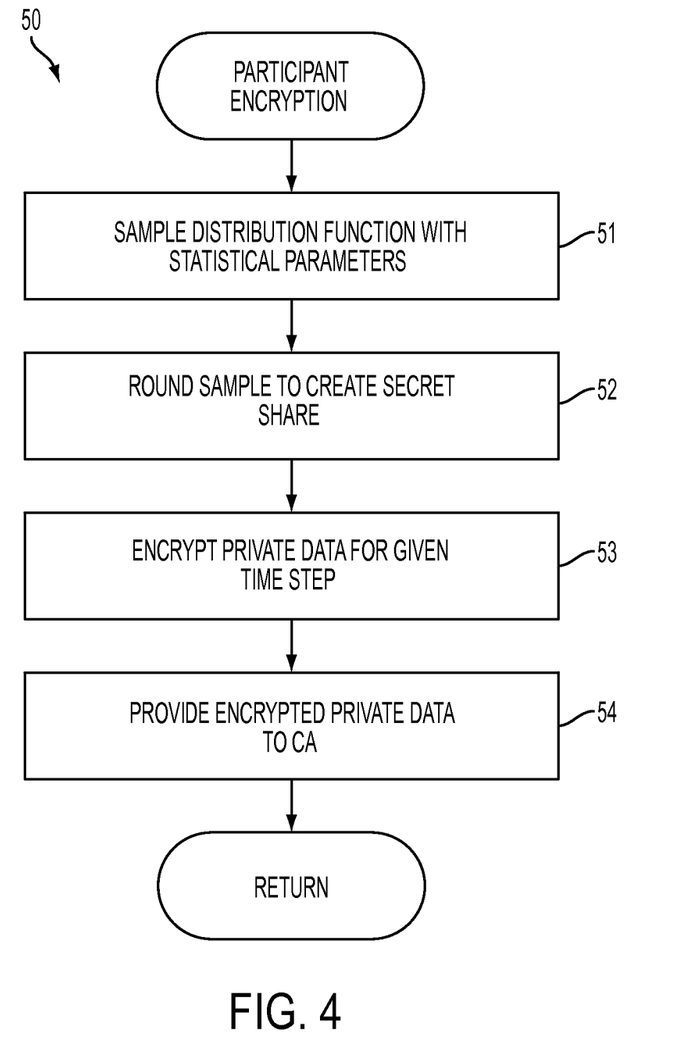
FIG. 4 is a flow diagram showing a routine for performing participant encryption for use in the method of FIG. 2.

Based on the probabilistic function chosen by the central authority during initialization, each participant independently computes a secret share, which is then used to encrypt the participant's private data. FIG. 4 is a flow diagram showing a routine 50 for performing participant encryption for use in the method 30 of FIG. 2. Each participant $u_i$ first samples the predefined probability density function $f(\ )$ with the statistical parameters $\mu$ and $\sigma$ (step 51). The sample is rounded to obtain an integer element $sk_i$ in $\mathbb{Z}_p$ (step 52), and the rounded value becomes the participant $u_i$'s secret share. In one embodiment, the sample is rounded down if less than 0.5 and rounded up if equal to or more than 0.5. However, the manner of rounding the sample to the nearest integer is not critical, so long as all of the participants adopt the same manner of rounding.

Each participant $u_i$ "encrypts" his private data $x_i$ using the secret key $sk_i$ for a given time step to generate encrypted private data $c_i$ (step 53). For instance, the private data $x_i$ could be encrypted, in accordance with:

$$c_i = g^{x_i} \cdot H(t)^{sk_i}$$

where g represents the random generator; $x_i$ represents participant $u_i$'s private data; $sk_i$ represents the participant $u_i$'s secret share; H(t) represents a hash function at time t, and t is a time step within which all operations must occur, assuming synchronous operations. In one embodiment, the hash function H(t) is modeled as a random oracle, such that $H: \mathbb{Z} \rightarrow \mathbb{G}$. Other encryption functions are possible. The encrypted private data is then provided to the central authority (step 54).

Figure 5:
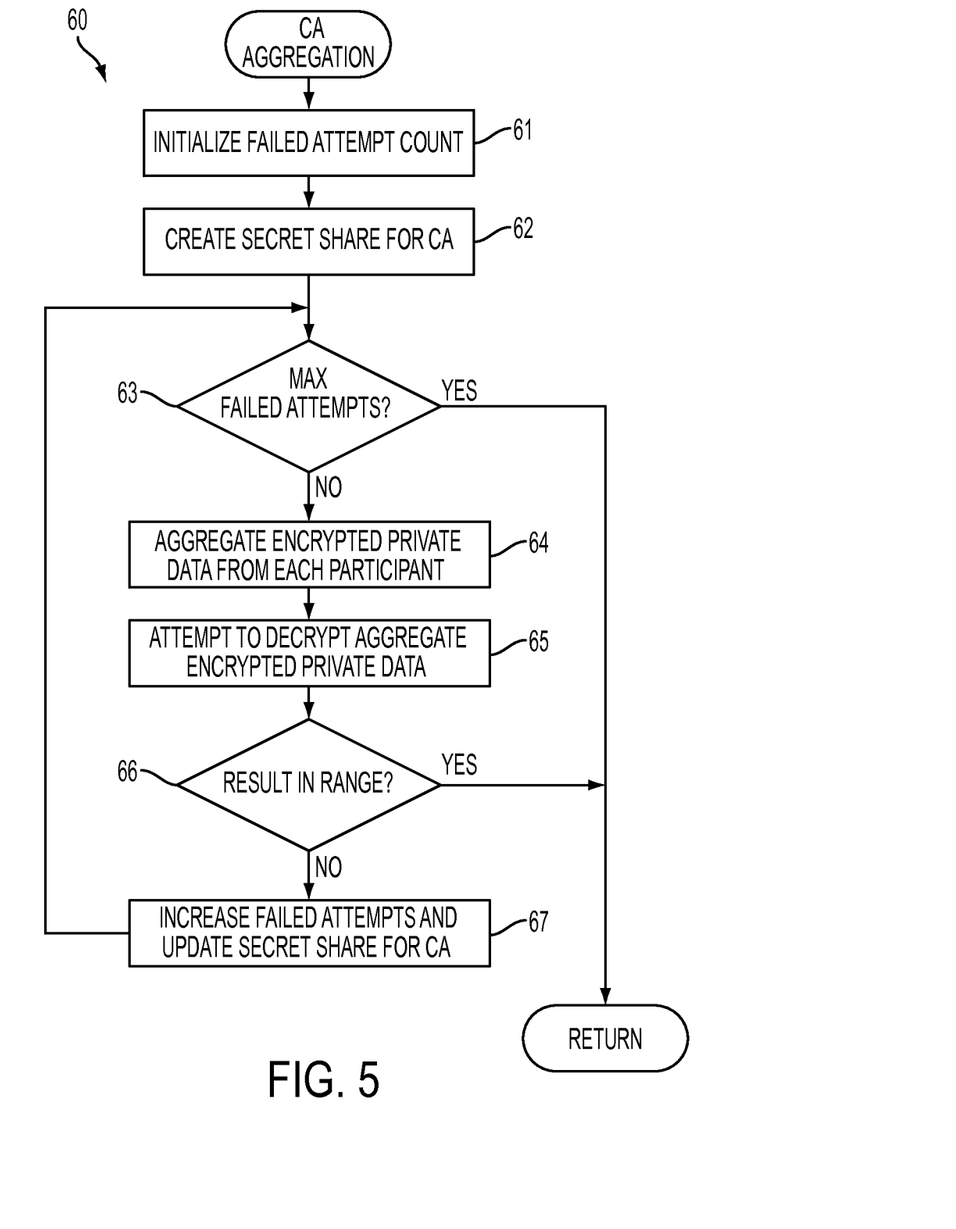
FIG. 5 is a flow diagram showing a routine for performing central authority aggregation for use in the method of FIG. 2.

The central authority attempts to decrypt the encrypted private data $c_i$ by relying on knowledge of the predefined probabilistic density function $f(\ )$. If enough participants $u_i$ join, their secret shares $sk_i$ will combine into a secret with a high likelihood, which the central authority will be able to discover relatively efficiently and without directly interacting with any of the participants. FIG. 5 is a flow diagram showing a routine 60 for performing central authority aggregation for use in the method 30 of FIG. 2. Preliminarily, the central authority sets up a failed attempt count (step 61). Further, the central authority, like each participant $u_i$, creates a secret share $sk_0$ (step 62). Here, the central authority creates an initial secret share $sk_0$ in accordance with:

$$sk_0 = p - n\mu \mod(p)$$

where p is the prime order of the cyclic group $\mathbb{G}$; n is the number of participants; and $\mu$ is the mean of the distribution function $f(\ )$ (step 62). Other ways to compute the initial secret share $sk_0$ are possible. In a further embodiment, the central authority and the last of the participants may collaborate to enable the central authority to choose a secret share $sk_0$, such that the summation of the secret shares $sk_i$ of the participants and the secret share $sk_0$ of the central authority equal 0.

The central authority makes a finite number of decryption attempts. If the failed attempt count reaches the maximum allowable (step 63), the central authority gives up. Otherwise, during each decryption attempt, the central authority first aggregates the encrypted private data $c_i$ from each participant $u_i$ into an encrypted aggregate V (step 64) in accordance with:

$$V = H(t)^{sk_0} \prod_{i=1}^{n} c_i$$

where $c_i$ represents the encrypted data of each participant $u_i$; H(t) represents the hash function at time t; $sk_0$ represents the secret share for the central authority; and n is the number of participants. The central authority attempts to decrypt the encrypted aggregate V by taking the discrete logarithm of the encrypted aggregate V with a logarithmic base equal to the random generator g (step 65). Based on knowledge of the predefined probabilistic density function $f(\ )$, the decrypted aggregate is expected to fall within a range of values that, in one embodiment, is [m, M], where $0<m<M<<\mu$ and $\mu$ is a mean of the distribution function $f(\ )$. If the decrypted aggregate falls within the range of values (step 66), decryption has been successful. Otherwise, the failed attempt count is incremented and the central authority's secret key $sk_0$ is updated in accordance with:

$$sk_0 = sk'_0 + \sum_{i=1}^{F} i(-1)^{i+1}$$

where $sk_0'$ is the central authority's original secret share, $F=\{1, 2, \ldots, \lfloor 3\sqrt{n}\sigma \rfloor\}$ is the number of failed attempts, $\sigma$ is the standard deviation of the distribution function $f(\ )$ and n is the number of participants (step 67). Other ways to update the secret share $sk_0$ are possible. Note that the interval over which b is defined ensures that the central authority will eventually find the correct decryption secret share with a probability of 99.7%. The central authority continues to attempt decryption until either succeeding or the failed attempt count reaches the maximum allowable (step 63).

In a further embodiment, the central authority can facilitate convergence on a decryption result by providing to each participant a range of standard deviations $\sigma$ of the distribution function $f(\ )$, instead of just one value. Each participant generates a vector of secret shares, one secret share per standard deviation $\sigma$ provided, and sends a vector containing the contributed data encrypted with each secret share to the central authority. When reattempting decryption, the central authority can select the standard deviation $\sigma$ with which decryption will be reattempted. If decryption with a given standard deviation $\sigma$ succeeds, the central authority indicates to the participants the entry within their respective vectors from which a secret share was successfully drawn and the participants will use that entry for the next encryption attempts, thereby improving the probability of the central authority discovering the secret and succeeding in decrypting the aggregate value.

In a still further embodiment, the central authority can facilitate convergence on a decryption result by requesting each participant to use a series of possible secret shares, instead of just one. Each participant sends a vector containing the contributed data encrypted with each secret share to the central authority. As described supra, the central authority can reattempt decryption with another set of secret shares.

In a yet further embodiment, participants can facilitate verification of successful decryption by appending an homomorphic message authentication code (MAC) to each of their encrypted private data $c_i$, as follows:

$$m_i = MAC(g^{x_i})$$

The MAC provided by each of the participants can then be formed into a multiplicatively homomorphic MAC:

$$\prod_{i=1}^{n} m_i = MAC\left(\prod_{i=1}^{n} g^{x_i}\right)$$

With a multiplicatively homomorphic MAC, the central authority can verify whether a decryption was successful if the aggregated MACs match the product of each contributed MAC before attempting the discrete logarithm. This optimization tremendously improves verification speed.

In an even further embodiment, the multiplicatively homomorphic MAC can be replaced by a public key encryption scheme with multiplicative homomorphism, such as RSA. Each participant encrypts its contribution with a public key (PK) as follows:

$$m_i = Enc_{PK}[g^{x_i}]$$

The central authority then verifies:

$$\prod_{i=1}^{n} m_i = Enc_{PK}\left[\prod_{i=1}^{n} m_i\right] = Enc_{PK}\left[\prod_{i=1}^{n} g^{x_i}\right]$$

The public key can be the key of any of the participants, or of another central authority, but should not be in control of the central authority.

Figure 6:
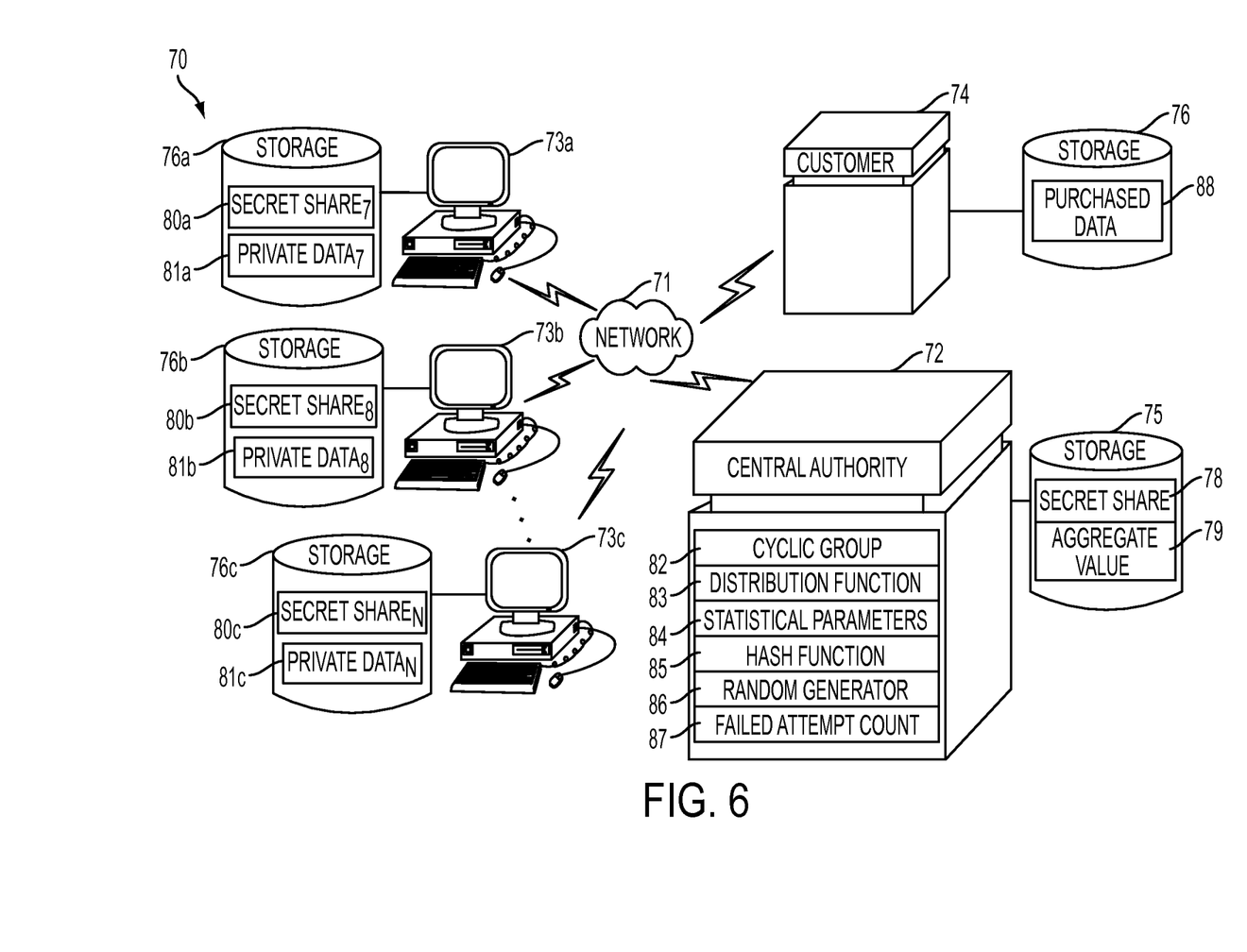
FIG. 6 is a block diagram showing a computer-implemented system for establishing distributed secret shares in a private data aggregation scheme in accordance with one embodiment.

The foregoing methodology can be performed by a set of computers operating independently over a network. FIG. 6 is a block diagram showing a computer-implemented system 70 for establishing distributed secret shares in a private data aggregation scheme in accordance with one embodiment. Each of the participating users 14*a-c* operates a personal computer 73*a-c* or similar computational device, while the central authority, acting as a data broker 12 or aggregator, operates a server 72 or similar computational device and the customer 13, if applicable, operates a customer server 74 or similar computational device. The servers 72, 74 and personal computers 73*a-c* include components conventionally found in general purpose programmable computing devices, such as a central processing unit, memory, input/output ports, network interfaces, and non-volatile storage, although other components are possible. In addition, other computational components are possible.

The servers 72, 74 and personal computers 73*a-c* are all interconnected over a network 71, which could be a local area network, enterprise network, or wide area network, including the Internet, or some combination thereof. The personal computers 73*a-c* of the participating users 14*a-c* each respectively include a storage device 76*a-c* within which is stored a secret share 80*a-c* and private data 81*a-c*. Following encryption of their respective private data 81*a-c* using their secret shares 80*a-c*, the participating users 14*a-c* upload their encrypted private data to the central authority's server 72 via the network 71. The central authority's server 72 maintains in memory the state set up during initialization, including selection of the cyclic group 82, distribution function 83, statistical parameters 84, hash function 85, and random generator 86, plus the failed attempt count 87. The central authority's server 72 also includes a storage device 75 within which is stored the central authority's secret share 78 and the aggregate value 79. In turn, following successful decryption, the central authority's server 72 uploads the decrypted aggregate value 79 to the customer's server 74, where applicable, which includes a storage device 76 within which is stored any purchased data 88. Still other computer systems, storage devices, and components are possible.

The secret sharing methodology has been empirically tested. In this context, number of runs is defined as the number of algorithm iterations necessary until a set of secret shares is established, such that the sum of all secret shares $sk_j$ equals a parameter chosen by the central authority, such as pt. In other terms, the failed attempt count is set to 1, such that, if a decryption attempt is not successful the first time with $sk_i=pt$, then all participating users reset their secret shares and try again.

Figure 7:
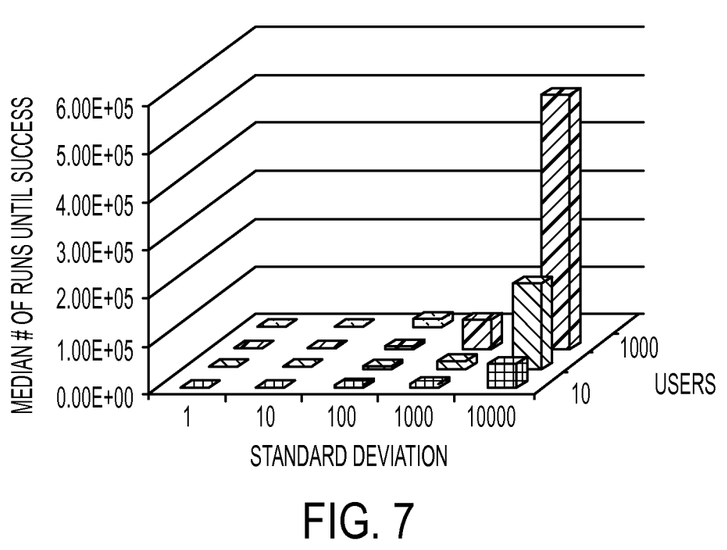
FIG. 7 is a graph comparing, by way of example, statistical parameter choice versus time-to-successful aggregator description.

The choice of statistical parameters can affect performance of the algorithm. FIG. 7 is a graph comparing, by way of example, statistical parameter choice versus time-to-successful aggregator description. The x-axis represents standard deviations $\sigma$ of the distribution function $f(\ )$ as specified to the participating users for purposes of generating secret shares. The y-axis represents the median number of runs until success. The z-axis represents the number of participating users.

Each bar in the graph shows the number of runs made until the sum of all individual participating users' secret shares $sk_i$ equaled the mean $\mu=0$. Empirically, an increase in the standard deviation $\sigma$ increases the number of runs made until success by a factor of 9, while an increase in the standard deviation $\sigma$ increases the number of runs made until success by a factor of 3 as the number of users increases. This difference implies that increasing the standard deviation $\sigma$ has a threefold negative effect on the time required for the central authority to find the correct aggregate decryption key. As a result, for smaller sets of participating users, larger standard deviations impact performance at a higher rate than with a large number of users. In other words, the larger the number of users, the less the relative impact of standard deviation increase. In absolute, a smaller set of users guarantees faster convergence.

Figure 8:
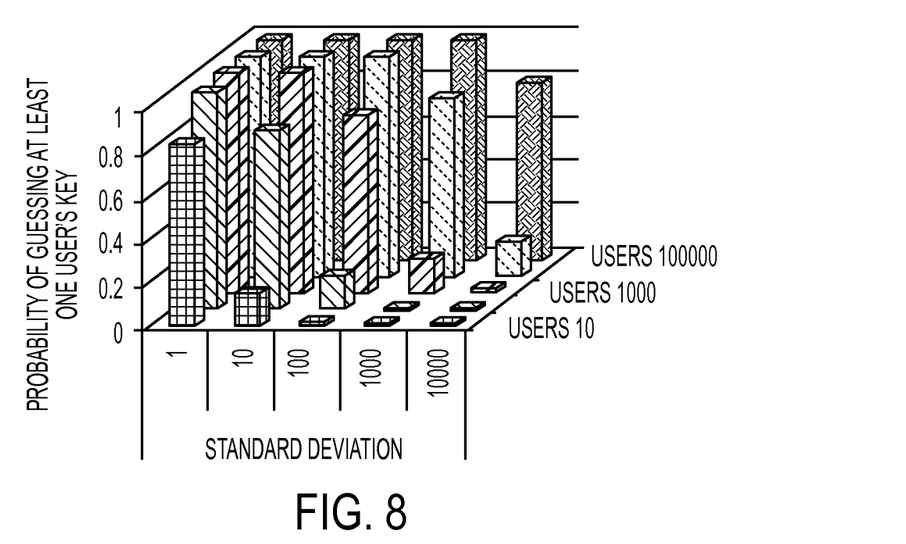
FIG. 8 is a graph comparing, by way of example, probability of adversary correctly guessing at least one secret share as a function of standard deviation.

The choice of statistical parameters can also have an effect on security. FIG. 8 is a graph comparing, by way of example, probability of adversary correctly guessing at least one secret share as a function of standard deviation. The x-axis represents standard deviations $\sigma$ of the distribution function $f(\ )$ as specified to the participating users for purposes of generating secret shares. The y-axis represents the probability of an adversary guessing at least one of the participating user's secret share $sk_i$. The z-axis represents the number of participating users.

Each bar in the graph shows the probability of an attacker correctly guessing the secret share of at least one of the participating users, which can be approximated as follows:

$$Pr(\text{correctly guessing at least one key}) =$$
$$1 - Pr(\text{not guessing any key correctly}) = 1 - ((6\sigma-1)/6\sigma)^n$$

where n is the number of users. Consider the worst-case scenario, where an attacker searches the entire possible key space to find the correct key with a 99.7% probability (within $[-3\sigma, +3\sigma]$). This attacker is the least capable attacker possible, and therefore the probability represents a lower bound. Moreover, assume that the participating users choose their secret shares $sk_i$ independently from each other. Empirically, the probability decreases sharply with the increase of the standard deviation $\sigma$, suggesting that a standard deviation $\sigma$ of 1000 (represented with 10 bits) provides reasonable security for 100 users. Note that a larger standard deviation $\sigma$ (represented from 20 bits up to 128 bits) provides several orders of magnitude less probability of correctly guessing the secret share of at least one user.

Figure 9:
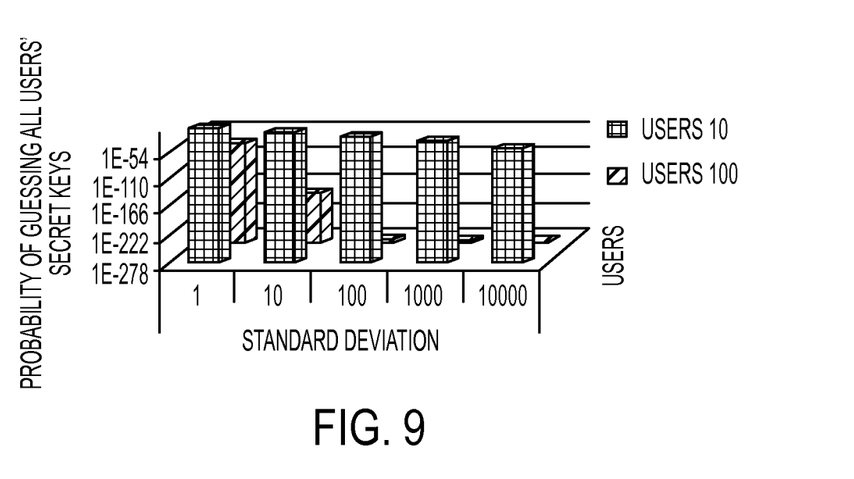
FIG. 9 is a graph comparing, by way of example, probability of adversary correctly guessing all secret shares as a function of standard deviation.

FIG. 9 is a graph comparing, by way of example, probability of adversary correctly guessing all secret shares as a function of standard deviation. The x-axis represents standard deviations $\sigma$ of the distribution function $f(\ )$ as specified to the participating users for purposes of generating secret shares. The y-axis represents the probability of an adversary guessing all of the participating users' secret shares $sk_i$. The z-axis represents the number of participating users.

Each bar in the graph shows the probability of an attacker correctly guessing the secret shares of all of the participating users, which, based on the same assumptions made in the previous equation, has been determined in accordance with:

$$Pr(\text{correctly guessing all users' keys}) = \frac{1}{(6\sigma)^n}$$

where n is the number of users. Empirically, with a small standard deviation (less than 10 bits), the probability goes down to negligible values of less than 10 to 50. Hence, the probability that an attacker can guess all users' secret shares is low, even with extremely small standard deviations, which could speed up the computation of the aggregate secret share by the aggregator. The actual, non-worst case probability can be determined in accordance with:

$$Pr(\text{correctly guessing all users' keys}) =$$
$$\left(\sum_{k=\mu-3\sigma}^{\mu+3\sigma} Pr(sk_0 = k \wedge sk_i = k)\right)^n == \left(\sum_{k=\mu-3\sigma}^{\mu+3\sigma} Pr(sk_0 = k)^2\right)^n$$

where $sk_0$ is sampled from a discrete Gaussian distribution dN over $[\mu-3\sigma, \mu+3\sigma]$ with statistical parameters $(\mu, \rho^2)$. In summary, empirical analysis shows that the methodology does provide interesting properties as long as an adversary learning the secret shares of a few users can be tolerated, and what matters is protection of most of the secret shares.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for establishing distributed secret shares in a private data aggregation scheme, comprising the steps of:
   an aggregator server comprising a processor and memory within which code for execution by the processor is stored, further comprising:
   a random generator maintained in the memory and chosen at random from a cyclic group of a set of prime order defined over a range of values of private data; and
   a distribution function over the cyclic group and a set of statistical parameters bounding the distribution function, also maintained in the memory;
   a plurality of participant computers each comprising a processor and memory within which code for execution by the processor is stored, for each participant computer further comprising:
   one of the values of the private data maintained in the memory;
   a state initialization module configured in the participant computer to receive the set of prime order, the statistical parameters and the random generator from the aggregator server;
   a secret share module configured in the participant computer to create a secret share by a probabilistic random sampling of the distribution function bounded by the statistical parameters; and an encryption module configured in the participant computer to encrypt the private data value held by the participant computer into encrypted data using the participant computer's secret share;

the aggregator server further comprising:

an aggregation module configured in the aggregator server to combine the encrypted data of each participant computer into an encrypted aggregate using the aggregator's secret share; and a decryption module configured in the aggregator server to find a decrypted aggregate.

2. A system according to claim 1, further comprising:
the aggregator server further comprising:
a range of values within which the decrypted aggregate is expected to be, the expected range comprises [m, M], where $0<m<M<<\mu$ and $\mu$ is a mean of the distribution function,
wherein the decryption module is further configured to repeat the finding of the decrypted aggregate when the decrypted aggregate falls outside the range of values.

3. A system according to claim 2, further comprising:
the aggregator server further comprising:
a secret share module configured to determine the secret share $sk_0$ for the aggregator upon each repeated finding of the decrypted aggregate in accordance with:

$$sk_0 = sk'_0 + \sum_{i=1}^{F} i(-1)^{i+1}$$

where $sk'_0$ is the central authority's original secret share; $F=\{1, 2, \ldots, \lfloor 3\sqrt{n\sigma} \rfloor\}$ is the number of failed attempts; each participant computer is in a group of n users $U=\{u_1, \ldots, u_n\}$; and where $\sigma$ is a standard deviation of the distribution function.

4. A system according to claim 1, further comprising:
the aggregator server further comprising:
the aggregation module further configured in the aggregator server to solve the encrypted aggregate V of the participant computers in accordance with:

$$V = H(t)^{sk_0} \prod_{i=1}^{n} c_i$$

where $c_i$ represents the encrypted data of each participant computer $x_i$ in a group of n users $U=\{u_1, \ldots, u_n\}$; $sk_0$ represents the secret share for the aggregator, such that $sk_0 = p - n\mu \bmod(p)$, where $\mu$ is a mean of the distribution function and p is the set of prime order of the cyclic group; and H(t) represents the hash function at time t.

5. A system according to claim 1, further comprising:
each participant computer further comprising:
the state initialization module further configured to receive a range of the statistical parameters from the aggregator server;
the secret share module further configured in the participant computer to create a vector comprising a plurality of secret shares for each participant computer, to encrypt the private data value held by the participant computer into a vector containing the encrypted data using each of the plurality of secret shares, and to provide the vector containing the encrypted data to the central authority; and the aggregator server further comprising:
the decryption module further configured in the aggregator server to provide an entry within the vectors that the participant computers will use for a next encryption attempt when the decrypted aggregate is not initially found.

6. A computer-implemented method for establishing distributed secret shares in a private data aggregation scheme, comprising the steps of:
selecting, through an aggregator server, a random generator chosen at random from a cyclic group of a set of prime order defined over a range of values of private data;
choosing, also through the aggregator server, a distribution function over the cyclic group and a set of statistical parameters bounding the distribution function;
providing the set of prime order, the statistical parameters and the random generator to a plurality of participant computers that each hold one of the values of the private data;
creating a secret share on each participant computer by a probabilistic random sampling of the distribution function bounded by the statistical parameters, and encrypting on each participant computer the private data value held by the participant computer into encrypted data using the participant computer's secret share; and
combining, through the aggregator server, the encrypted data of each participant computer into an encrypted aggregate using the aggregator server's secret share, and finding a decrypted aggregate,
wherein the steps are performed on a suitably-programmed computer.

7. A method according to claim 6, further comprising the steps of:
setting a range of values within which the decrypted aggregate is expected to be; and
repeating the finding of the decrypted aggregate when the decrypted aggregate falls outside the range of values.

8. A method according to claim 7, wherein the expected range comprises [m, M], where $0<m<M<<\mu$ and $\mu$ is a mean of the distribution function.

9. A method according to claim 7, further comprising the step of:
determining the secret share $sk_0$ for the aggregator server upon each repeated finding of the decrypted aggregate in accordance with:

$$sk_0 = sk'_0 + \sum_{i=1}^{F} i(-1)^{i+1}$$

where $sk'_0$ is the central authority's original secret share; $F=\{1, 2, \ldots, \lfloor 3\sqrt{n\sigma} \rfloor\}$ is the number of failed attempts; each participant computer is in a group of n users $U=\{u_1, \ldots, u_n\}$; and $\sigma$ is a standard deviation of the distribution function.

10. A method according to claim 7, further comprising the step of:
limiting the finding of the decrypted aggregate to a maximum number of repetitions.

11. A method according to claim 10, further comprising the step of:
requiring each participant computer to repeat the creating of a secret share and the encrypting of the one value of the private data held by that participant computer when the maximum number of repetitions is exceeded; and thereafter, again combining the encrypted data of each participant computer and reattempting the finding of the decrypted aggregate.

12. A method according to claim 6, further comprising the step of:

selecting the statistical parameters from the group comprising mean, standard deviation and variance.

13. A method according to claim 6, further comprising the step of:

solving the secret share of the aggregator as a difference between the set of prime order and product of a number of the participant computers and the mean modulo the set of prime order.

14. A method according to claim 6, further comprising the step of:

temporally tying the hash function to a single time step that is applicable to the encrypting of the one value of the private data held by each participant computer and the combining of the encrypted data of each participant computer.

15. A method according to claim 6, further comprising the step of:

rounding the random sampling to an integer value for use as the secret share of each participant computer.

16. A method according to claim 6, further comprising the step of:

solving the encrypted data $c_i$ of each participant computer i in a group of n users $U=\{u_1, \ldots, u_n\}$ in accordance with:

$$c_i = g^{x_i} \cdot H(t)^{sk_i}$$

where g represents the random generator, such that $g \in \mathbb{G}$, where $\mathbb{G}$ is the cyclic group of the set of prime order p; $x_i$ represents the one value of the private data for the participant computer i, such that $x_i \in \mathbb{Z}_p$; $sk_i$ represents the secret share for the participant computer $x_i$, which is an integer element in $\mathbb{Z}_p$; and H(t) represents the hash function at time t.

17. A method according to claim 6, further comprising the step of:

appending an homomorphic message authentication code (MAC) $m_i$ created by each participant computer i in a group of n users $U=\{u_1, \ldots, u_n\}$ in accordance with:

$$m_i = MAC(g^{x_i})$$

where g represents the random generator, such that $g \in \mathbb{G}$, where $\mathbb{G}$ is the cyclic group of the set of prime order p; and $x_i$ represents the one value of the private data for the participant computer i, such that $x_i \in \mathbb{Z}_p$; $sk_i$; and solving an aggregated multiplicatively homomorphic message authentication code in accordance with:

$$\prod_{i=1}^{n} m_i = MAC\left(\prod_{i=1}^{n} g^{x_i}\right)$$

wherein the finding of the decrypted aggregate is considered successful if the aggregated multiplicatively homomorphic message authentication code matches the product of each appended homomorphic message authentication code $m_i$.

18. A method according to claim 6, further comprising the step of appending an homomorphic message authentication code (MAC) $m_i$ encrypted by each participant computer i in a group of n users $U=\{u_1, \ldots, u_n\}$ using a public key (PK) encryption scheme with multiplicative homomorphism in accordance with:

$$m_i = Enc_{PK}[g^{x_i}]$$

where g represents the random generator, such that $g \in \mathbb{G}$, where $\mathbb{G}$ is the cyclic group of the set of prime order p; and $x_i$ represents the one value of the private data for the participant computer i, such that $x_i \in \mathbb{Z}_p$; $sk_i$; and solving an aggregated multiplicatively homomorphic message authentication code in accordance with:

$$\prod_{i=1}^{n} m_i = Enc_{PK}\left[\prod_{i=1}^{n} m_i\right] = Enc_{PK}\left[\prod_{i=1}^{n} g^{x_i}\right]$$

wherein the finding of the decrypted aggregate is considered successful if the aggregated multiplicatively homomorphic message authentication code matches the product of each appended homomorphic message authentication code $m_i$.

19. A method according to claim 6, further comprising the steps of:

providing a range of the statistical parameters to the participant computers;

creating a vector comprising a plurality of secret shares for each participant computer, and encrypting the private data value held by the participant computer into a vector containing the encrypted data using each of the plurality of secret shares;

providing the vector containing the encrypted data to the central authority; and when the decrypted aggregate is not initially found by the central authority, providing an entry within the vectors that the participant computers will use for a next encryption attempt.

20. A method according to claim 6, further comprising the steps of:

providing a request to use a series of the secret shares to the participant computers;

encrypting the private data value held by the participant computer into a vector containing the encrypted data using each of the plurality of secret shares in the series;

providing the vector containing the encrypted data to the central authority; and when the decrypted aggregate is not initially found by the central authority, providing an entry within the series of the secret shares that the participant computers will use for a next encryption attempt.

21. A method according to claim 6, wherein the distribution function comprises a Gaussian distribution.

22. A non-transitory computer readable storage medium storing code for executing on a computer system to perform the method according to claim 6.

* * * * *